(12) United States Patent
Challener et al.

(10) Patent No.: US 6,959,390 B1
(45) Date of Patent: Oct. 25, 2005

(54) DATA PROCESSING SYSTEM AND METHOD FOR MAINTAINING SECURE USER PRIVATE KEYS IN NON-SECURE STORAGE

(75) Inventors: David Carroll Challener, Raleigh, NC (US); Daryl Carvis Cromer, Apex, NC (US); Mark Charles Davis, Durham, NC (US); Scott Thomas Elliott, Raleigh, NC (US); Howard Jeffrey Locker, Cary, NC (US); Andy Lloyd Trotter, Raleigh, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/262,123

(22) Filed: Mar. 3, 1999

(51) Int. Cl.⁷ ............................. G06F 11/30; H04L 9/00
(52) U.S. Cl. ...................... 713/194; 380/281; 380/282; 380/284; 380/285
(58) Field of Search ....................... 713/194; 380/270, 380/282, 285, 281

(56) References Cited

U.S. PATENT DOCUMENTS

| | | | |
|---|---|---|---|
| 4,634,807 A * | 1/1987 | Chorley et al. ............. | 713/194 |
| 5,142,578 A * | 8/1992 | Matyas et al. ............... | 380/280 |
| 5,315,658 A * | 5/1994 | Micali ........................ | 380/286 |
| 5,398,285 A | 3/1995 | Borgelt et al. | |
| 5,511,122 A | 4/1996 | Atkinson | |
| 5,734,718 A | 3/1998 | Prafullchandra | |
| 5,768,373 A | 6/1998 | Lohstroh et al. | |
| 5,812,669 A | 9/1998 | Jenkins et al. | |
| 5,812,764 A | 9/1998 | Heinz, Sr. | |
| 5,825,300 A | 10/1998 | Bathrick et al. | |
| 5,953,422 A | 9/1999 | Angelo et al. | |
| 5,991,399 A * | 11/1999 | Graunke et al. .............. | 380/30 |
| 6,134,660 A * | 10/2000 | Boneh et al. ................ | 713/193 |
| 6,292,899 B1 * | 9/2001 | McBride ...................... | 713/194 |
| 6,311,270 B1 * | 10/2001 | Challener et al. ........... | 713/194 |

* cited by examiner

*Primary Examiner*—Kambiz Zand
(74) *Attorney, Agent, or Firm*—Anthony M. Magistrale; Daniel E. McConnell; Dillon & Yudell LLP

(57) ABSTRACT

A data processing system and method are disclosed for maintaining secure user private keys in a non-secure storage device. A master key pair is established for the system. The master key pair includes a master private key and a master public key. The master key pair is stored in a protected storage device. A unique user key pair is established for each user. The user key pair includes a user private key and a user public key. The user private key is encrypted utilizing the master public key. The encrypted user private key is stored in the non-secure storage device, wherein the encrypted user private key is secure while stored in the non-secure storage device.

10 Claims, 3 Drawing Sheets

DATA PROCESSING SYSTEM AND METHOD FOR MAINTAINING SECURE USER PRIVATE KEYS IN NON-SECURE STORAGE

BACKGROUND OF THE INVENTION

1. Field of the Invention

The present invention relates in general to data processing systems and, in particular, to a data processing system and method for maintaining multiple, secure private keys in a non-secure storage device. Still more particularly, the present invention relates to a data processing system and method for maintaining multiple, secure private keys in a non-secure storage device by encrypting the private keys utilizing a master public key stored in protected storage prior to storing the user private keys in the non-secure storage device.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

Encryption algorithms are known to ensure that only the intended recipient of a message may read and access the message. One known encryption algorithm is an asymmetric, or public key, algorithm. The public key algorithm is a method for encrypting messages sent from a first computer system to a second computer system. This algorithm provides for a key pair including a public key and a private key for each participant in a secure communication. This key pair is unique to each participant. An example of such an encryption scheme is an RSA key pair system.

Prior to the first computer system transmitting a message, the first computer system obtains the public key of the intended recipient of the message, in this case the second computer system. The public key of the second system is obtained by the first computer system from the second computer system. The first computer system then encrypts the message using the public key of the second computer system. The message is then transmitted to the computer identified by the public key, i.e. the second computer system. Upon receipt of the message, the second computer utilizes its private key to decrypt the message.

A key pair is also typically established for each user within a computer system for each application. A user may be a person, a device, an application, or anything else that may access an application. Therefore, many key pairs must be maintained by a computer system. Protected storage is required to store the key pairs. The protected storage is typically a storage device having very limited storage space. Because it takes a large number of bytes of protected storage to store a single RSA key, it is impractical to maintain multiple private keys in the protected storage.

Therefore a need exists for a data processing system and method for maintaining multiple, secure private keys in non-secure storage.

SUMMARY OF THE INVENTION

A data processing system and method are disclosed for maintaining secure user private keys in a non-secure storage device. A master key pair is established for the system. The master key pair includes a master private key and a master public key. The master key pair is stored in a protected storage device. A unique user key pair is established for each user. The user key pair includes a user private key and a user public key. The user private key is encrypted utilizing the master public key. The encrypted user private key is stored in the non-secure storage device, wherein the encrypted user private key is secure while stored in the non-secure storage device.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–5 of the drawings, like numerals being used for like and corresponding parts of the accompanying drawings.

The present invention is a method and system for maintaining multiple, secure user private keys in a non-secure storage device. Before storing the user private keys, the user private key is first encrypted utilizing a master key pair stored in protected storage. The master key pair is associated with only the system which generated the master key pair. A master key pair includes a master private key and a master public key. Preferably, only the master public key is utilized to encrypt the user key pair.

An RSA encrypted user private key is stored in a protected storage device within an encryption device. When the master public key is utilized to encrypt a message, only the master private key may be utilized to decrypt the message. Because the master private key is not made available, either to the system itself or a user, no other system or user will be able to decrypt the user private keys encrypted with the master public key. Therefore, the encrypted user private keys are secure even when they are stored in non-secure storage.

Each user within the system has a separate, unique user key pair established for each application within the system. The term "user" is understood to mean a person, a service, an application, a device, or any other entity which may access an application. The term "user" is not limited to a human user. Therefore, a user key pair is associated with a particular user and a particular application.

A certificate may be established within the system for a user to access a particular application. The certificate is established for and associated with a particular user and a particular application. The certificate includes a pointer to its associated application, an identity of the user associated with the user key pairs and this certificate, and a pointer to the user private key associated with this user and application. The application associated with a particular certificate may need to transmit a message encrypted utilizing this user's private key. The encryption engine included with the system accesses the user private key pointed to by the certificate. The encryption engine, then, decrypts the user private key. The message is encrypted by the encryption engine utilizing the decrypted user private key, and then transmitted.

Figure 1:
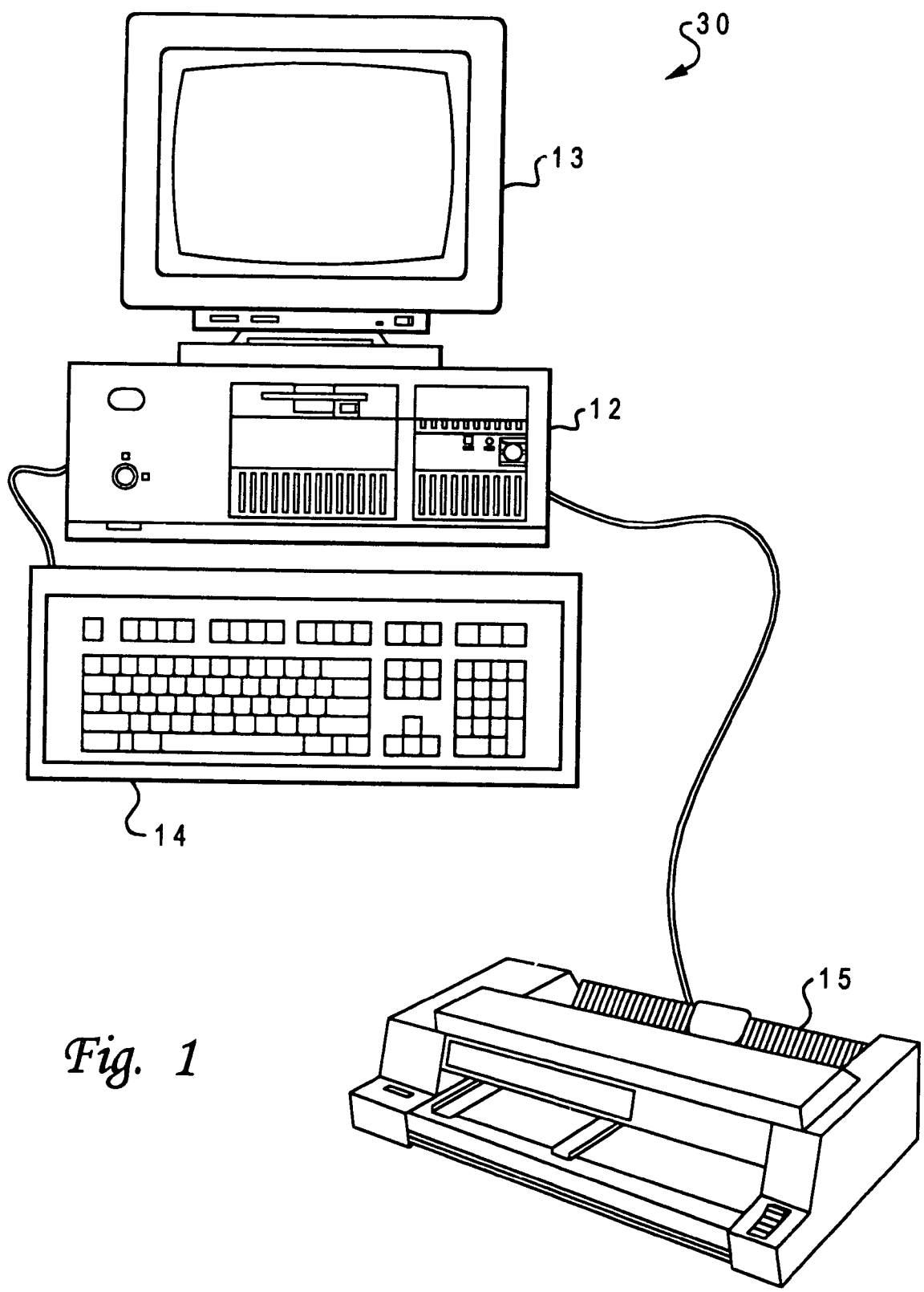
FIG. 1 illustrates a pictorial representation of a data processing system capable of maintaining multiple, secure private keys in non-secure storage in accordance with the method and system of the present invention.

FIG. 1 illustrates a pictorial representation of a data processing system capable of maintaining multiple, secure user private keys in a non-secure storage device in accordance with the method and system of the present invention. Computer system 30 includes a computer 12, a monitor 13, a keyboard 14, and a printer or plotter 15. Computer system 30 may be implemented utilizing any commercially available computer system which has been suitably programmed and which has been modified as described below.

Figure 2:
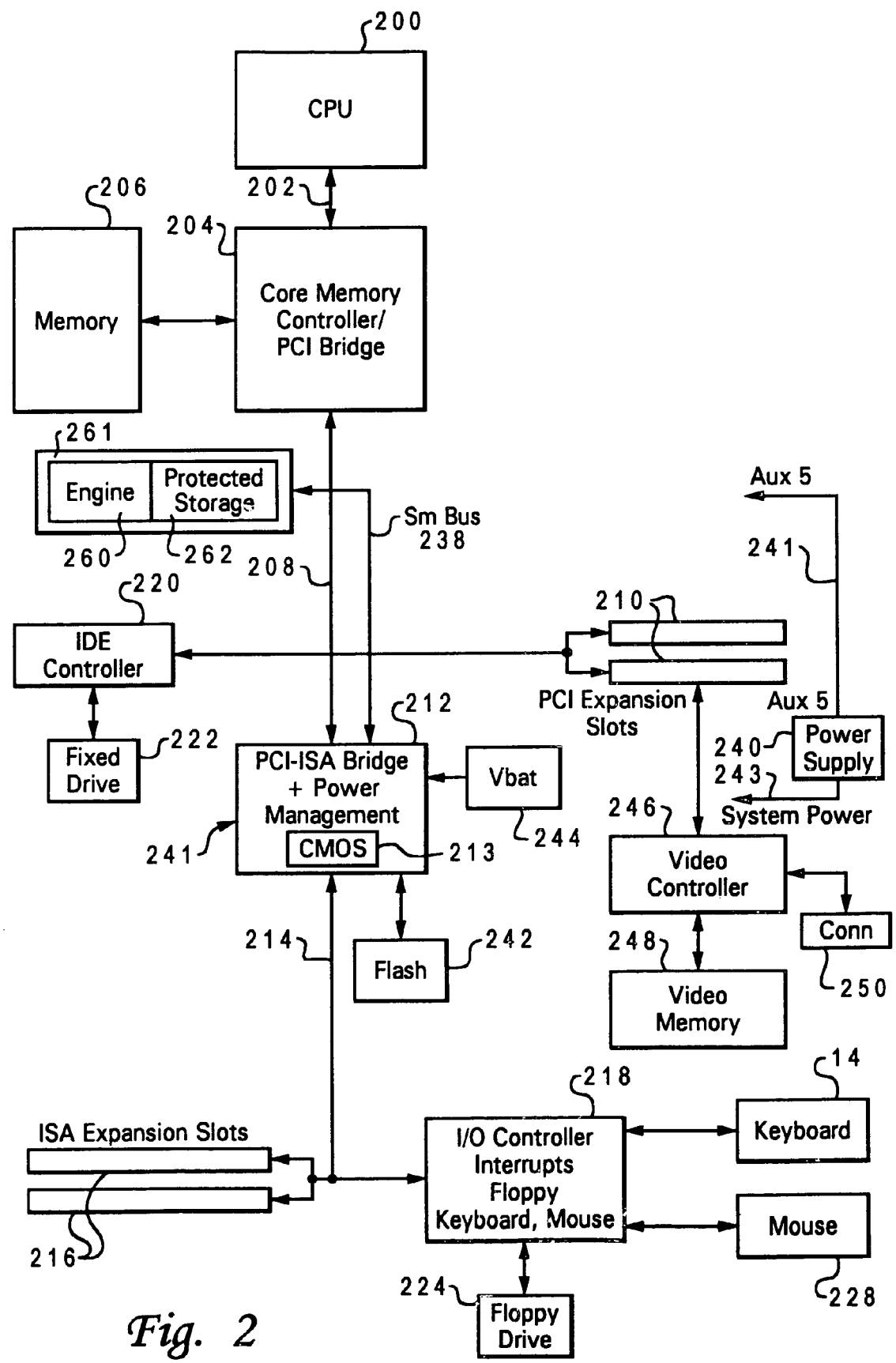
FIG. 2 depicts a more detailed pictorial representation of the data processing system of FIG. 1 in accordance with the method and system of the present invention.

FIG. 2 depicts a more detailed pictorial representation of the data processing system of FIG. 1 in accordance with the method and system of the present invention. Computer 12 includes a planar (also commonly called a motherboard or system board) which is mounted within computer 12 and provides a means for mounting and electrically interconnecting various components of computer 12 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices, such a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 14, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer 12 includes a video controller 246 which may, for example, be plugged into one of PCI expansion slots 210. Video controller 246 is connected to video memory 248. The image in video memory 248 is read by controller 246 and displayed on monitor 13 which is connected to computer 12 through connector 250.

Computer system 12 includes a power supply 240 which supplies full normal system power 243, and has an auxiliary power main AUX 5 241 which supplies full time power to the power management logic 212.

In accordance with the present invention, planar includes a security ASIC 261 which includes an encryption/decryption engine 260 which includes an encryption/decryption algorithm which is utilized to encode and decode messages transmitted and received by the planar, and protected storage 262. Engine 260 can preferably perform public\private key encryption. Engine 260 may access a protected storage device 262. Protected storage device 262 is accessible only through engine 260, and is a one-time writable device. Therefore, storage device 262 cannot be read or written to by the planar, device 222, or any other device. Keys stored within storage 262 are protected by engine 260 and are not accessible to the planar or its components. Storage device 262 is utilized to store the master key pair, including the master private key and master public key. Because keys require a large amount of storage and the limited storage space within storage device 262, it is not practical to store multiple user private keys in storage device 262. Device 262 may be implemented utilizing an electronically erasable storage device, such as an EEPROM. Access may be gained to non-readable storage device 262 in order to initially store the master private key. However, after the master private key is stored, it cannot be read. The keys stored in EEPROM 262 may not be read by any component of the planar other than engine 260.

ASIC 261, including engine 260 and EEPROM 262, is coupled to PCI-ISA bridge 212 utilizing a system management (SM) bus 238. System management bus 238 is a two-wire, low speed, serial bus used to interconnect management and monitoring devices. Those skilled in the art will recognize that ASIC 261 may be coupled to another bus within the planar.

Figure 3:
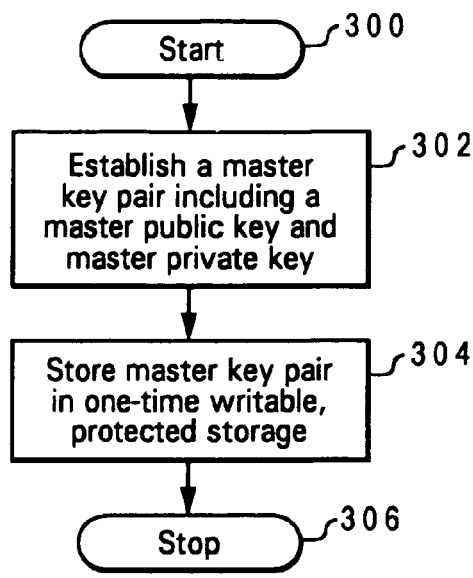
FIG. 3 illustrates a high level flow chart which depicts establishing and storing a master key pair in protected storage in a data processing system in accordance with the method and system of the present invention.

FIG. 3 illustrates a high level flow chart which depicts establishing and storing a master key pair in protected storage in a data processing system in accordance with the method and system of the present invention. The process starts as depicted at block 300 and thereafter passes to block 302 which illustrates establishing a master key pair for data processing system 30 (see FIG. 1). Next, block 304 depicts the storage of the master public key and master private key in protected storage 262 (see FIG. 2) which is a one-time writable, protected storage. The process then terminates as illustrated at block 306.

Figure 4:
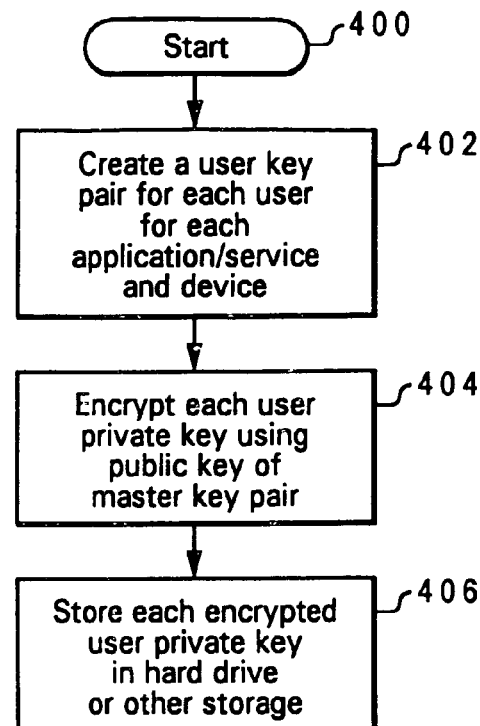
FIG. 4 depicts a high level flow chart which illustrates establishing and storing multiple, secure user private keys in non-secure storage in a data processing system in accordance with the method and system of the present invention.

FIG. 4 depicts a high level flow chart which illustrates establishing and storing multiple, secure user private keys in non-secure storage in a data processing system in accordance with the method and system of the present invention. The process starts as illustrated at block 400 and thereafter passes to block 402 which depicts a creation of a user key pair for each user. Next, block 404 illustrates the encryption of each user private key utilizing the master public key. Block 406, then, depicts the storage of each encrypted user private key in the hard drive or other storage. The user private keys encrypted by a particular data processing system are not capable of being utilized by other data processing systems. The process then passes to block 408 which illustrates establishing a certificate for accessing applications. A certificate includes a pointer to the application, a pointer to storage to locate the user private key for this application for this particular user, and an identifier which identifies this particular user. Thereafter, block 410 depicts the storage of the certificate in the hard drive or other storage. The process then terminates as depicted at block 412.

Figure 5:
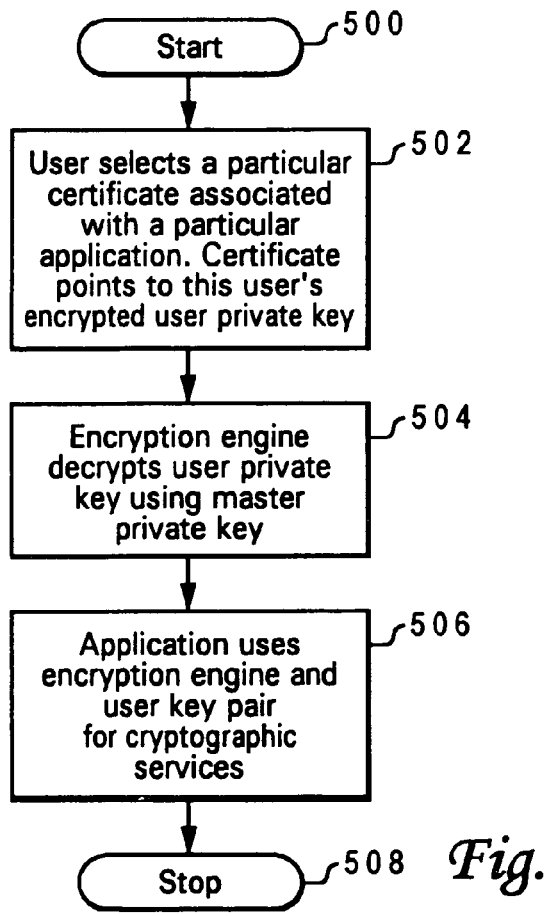
FIG. 5 illustrates a high level flow chart which depicts an application utilizing an encrypted user private key for cryptographic services in accordance with the method and system of the present invention.

FIG. 5 illustrates a high level flow chart which depicts an application utilizing an encrypted user private key for cryptographic services in accordance with the method and system of the present invention. The process starts as illustrated at block 500 and thereafter passes to block 502 which depicts a user selecting a particular certificate. The certificate is associated this user and with a particular application. It points to this user's encrypted user private key for the particular application. Thereafter, block 504 illustrates the encryption engine decrypting the user private key using the master private key. The encryption engine does not make the decrypted user private key available to any service, application, or device. Next, block 506 depicts the application associated with this certificate using the encryption engine and the user key pair for cryptographic services. The process then terminates as depicted at block 508.

While a preferred embodiment has-been particularly shown and described, it will be understood by those skilled in the art that various changes in form and detail may be made therein without departing from the spirit and scope of the present invention.

What is claimed is:

1. A method in a data processing system for maintaining multiple secure user private keys in a non-secure storage device, said method comprising the steps of:
   establishing an encryption device having an encryption engine and a protected storage device, wherein said protected storage device is accessible only through said encryption engine;
   establishing a master key pair for said system, said master key pair including a master private key and a master public key;
   storing said master key pair in said protected storage device;
   establishing a unique user key pair for each of multiple users, each of said user key pairs including a user private key and a user public key;
   said encryption engine encrypting each of said user private keys utilizing said master public key;
   storing each of said encrypted user private keys in said non-secure storage device, wherein each of said encrypted user private keys is secure while stored in said non-secure storage device;
   in response to receiving a message to transmit to a recipient, said encryption engine decrypting a particular user's private key utilizing said master private key;
   said encryption engine encrypting said message utilizing said decrypted particular user's private key and said recipient's public key; and
   transmitting said encrypted message to said recipient.

2. The method according to claim 1, wherein the step of establishing a unique user key pair for each of multiple users further comprises the step of associating each said user key pair with an application.

3. The method according to claim 2, further comprising the steps of:
   establishing a certificate, said certificate being associated with said application, said particular user's private key, and said particular user;
   in response to said particular user attempting to access said application utilizing said certificate, said encryption engine utilizing said certificate to determine a location within said non-secure storage device for said particular user's private key associated with said certificate;
   said encryption engine decrypting said particular user's private key; and
   said encryption engine utilizing said decrypted particular user's private key to encrypt messages transmitted by said application.

4. The method according to claim 1, wherein said step of storing each of said encrypted user private keys in said non-secure storage further comprises the step of storing each of said encrypted user private keys in a hard drive.

5. The method according to claim 4, further comprising the step of each of said unique user key pairs being capable of being utilized only in said data processing system wherein a particular user key pair is established, wherein said particular user key pair is not capable of being utilized in a second data processing system.

6. A data processing system for maintaining multiple secure user private keys in a non-secure storage device, said data processing system comprising:
   an encryption device for establishing a master key pair for said system that includes a master private key and a master public key, said encryption device including an encryption engine and a protected storage device for storing said master key pair wherein said protected storage device is capable of being accessed only through said encryption engine;
   said encryption device executing code for establishing a unique user key pair for each of multiple users, each of said user key pairs including a user private key and a user public key;
   said encryption engine executing code for encrypting each of said user private keys utilizing said master public key;
   a non-secure storage device for storing each of said encrypted user private keys, wherein each of said encrypted user private keys is secure while stored in said non-secure storage device;
   wherein said encryption engine, responsive to
   receiving a message to transmit to a recipient, executes code for decrypting a particular user's private key utilizing said master private key and executes code for encrypting said message utilizing said decrypted particular user's private key and said recipients public key; and wherein said system transmits said encrypted message to said recipient.

7. The system according to claim 6, further comprising said system executing code for associating each said user key pair with an application.

8. The system according to claim 7, further comprising:
said system executing code for establishing a certificate, said certificate being associated with said application, said particular user's private key, and said particular user;
in response to said particular user attempting to access said application utilizing said certificate, said encryption engine executing code utilizing said certificate for determining a location within said non-secure storage device for said particular user's private key associated with said certificate;
said encryption engine executing code for decrypting said particular users private key pair; and
said encryption engine capable of utilizing said decrypted particular user's private key to encrypt messages transmitted by said application.

9. The system according to claim 8, further comprising said system executing code for storing each of said encrypted user private keys in a hard drive.

10. The system according to claim 9, further comprising each of said unique user key pairs being capable of being utilized only in said data processing system wherein a particular user key pair is established, wherein said particular user key pair is not capable of being utilized in a second data processing system.

* * * * *